Feb. 15, 1927. 1,618,061
A. W. CRISTIANI
TILE FETTLING MACHINE
Filed Dec. 1, 1923 2 Sheets-Sheet 1
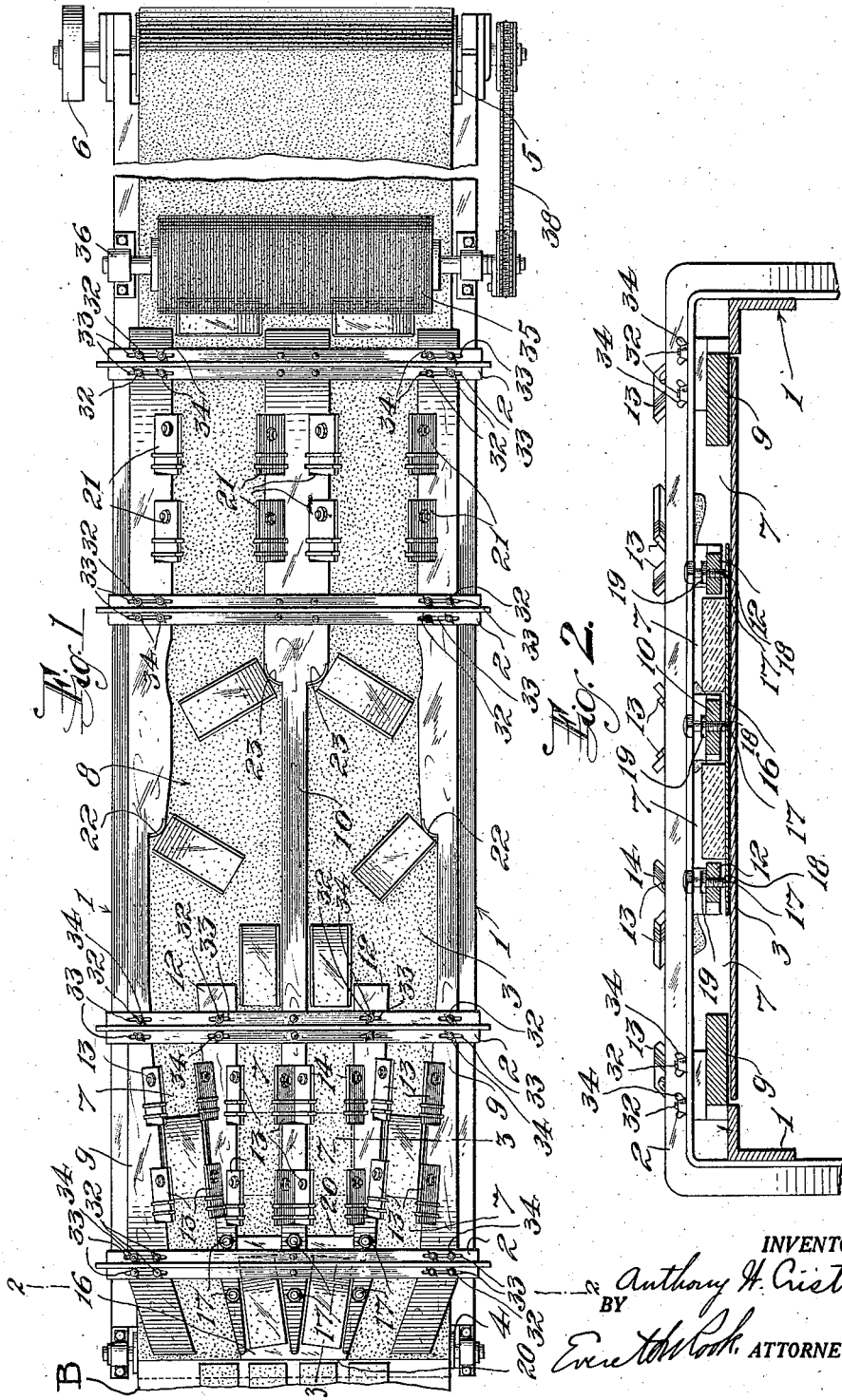
INVENTOR.
Anthony W. Cristiani,
BY
Everett H. Cook, ATTORNEYS.

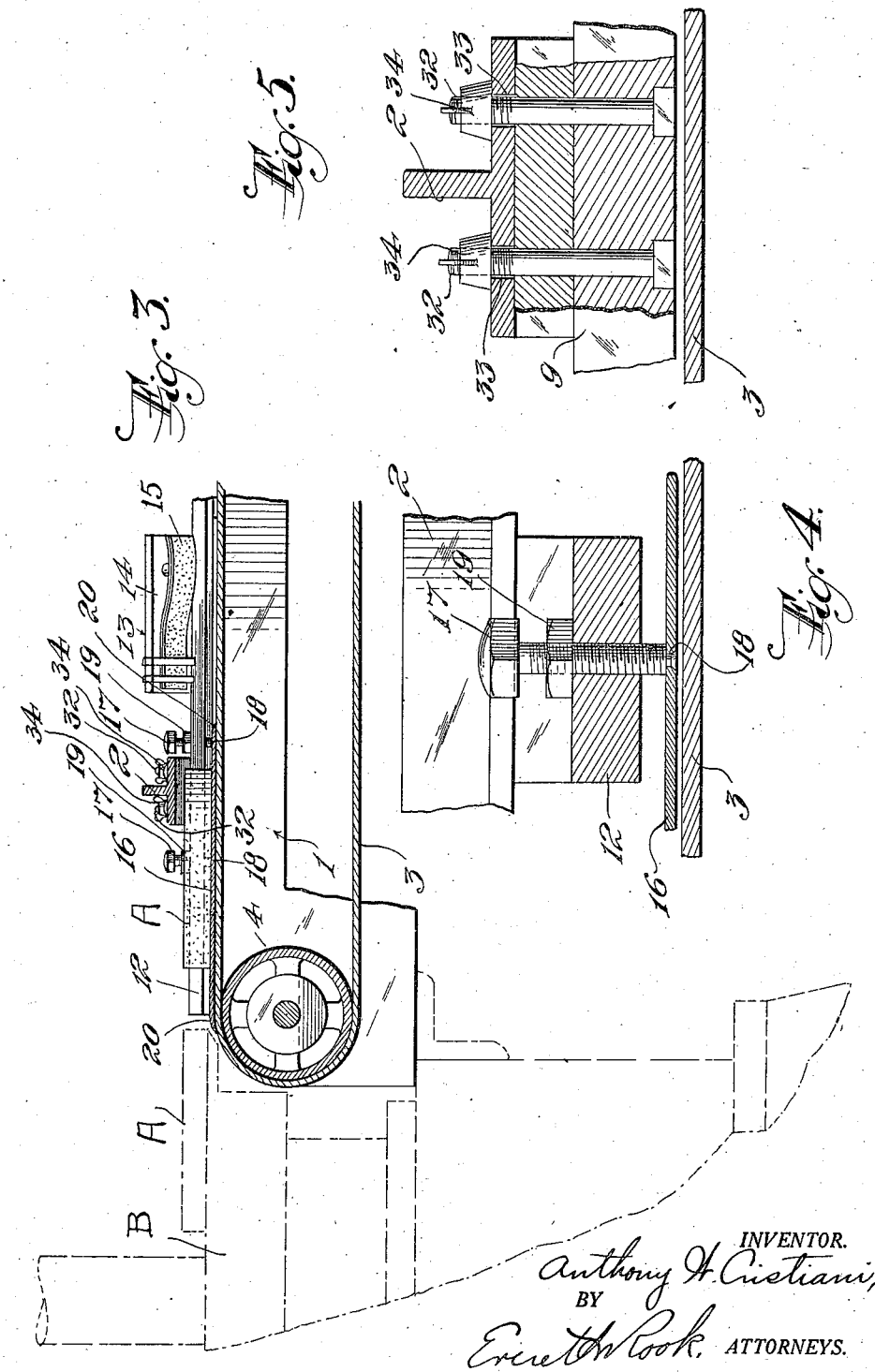

Patented Feb. 15, 1927.

1,618,061

UNITED STATES PATENT OFFICE.

ANTHONY W. CRISTIANI, OF RED BANK, NEW JERSEY.

TILE-FETTLING MACHINE.

Application filed December 1, 1923. Serial No. 678,027.

This invention relates to a machine for smoothing the rough edges of a tile which are caused by surplus material adhering to the edges during the pressing operation in a tile press due to the imperfect engagement and wear of the die members which form the tile, or for operating upon other objects; more particularly the invention consists of an improvement on a machine of the character described in my copending application filed June 15, 1921, Serial No. 477,661.

The machine described in said application consists in general of means such as an endless conveyor cooperating with two sets of fettling members such as abrading, rubbing or scraping devices, one set for each of two angularly disposed pairs of edges of a tile, whereby a plurality of tiles in a row are moved successively by said conveyor to cause engagement of one parallel pair of edges of each tile with one set of said fettling members, after which the tiles are successively turned and moved by the conveyor to cause engagement of another parallel pair of edges of each tile arranged at an angle to said first-mentioned pair of edges with the other set of said fettling members. The said machine is particularly designed to receive tile as they are discharged by a tile press, and where used with a press which discharges a plurality of rows of tiles at one time, two sets of fettling members for each row of tiles is required. As such an arrangement of fettling members requires a large amount of space and the space available for such a machine is limited, a machine for receiving a plurality of rows of tiles from a press at one time and utilizing a minimum number of fettling members is desirable.

The primary object of the present invention is to provide a machine embodying novel and improved features of construction for receiving simultaneously a plurality of rows of tiles or other objects from a tile press or other source and so manipulating said tiles or objects as to permit the utilization of the same set of fettling or other members for operating upon the tiles or objects of a plurality of said rows whereby the machine has large capacity, high efficiency, and occupies a small space.

Another object is to provide such a machine having means for receiving simultaneously a plurality of rows of tiles or other objects, and means for temporarily causing the objects of different rows to move at different velocities toward the fettling or operating members, to permit the objects from different rows to be alternately moved in a continuous row into engagement with the same operating members.

A further object is to provide in such a machine novel and improved means for alternately turning the tiles or other objects of different rows after one set of edges have been operated upon by one set of fettling or operating members to present edges angularly disposed to said first-mentioned edges to the next set of fettling or operating members, said objects of different rows being moved into one continuous row before they engage the fettling or operating members.

Other objects are to provide a machine of the character described including means for temporarily retarding movement of each object of one row while the corresponding object of another row is moved at its normal speed until it passes the first-mentioned object, and means for moving said objects into alinement in a continuous row to successively engage the operating members; to thus provide a plurality of entrance guideways one for each of a plurality of rows of objects and one main guideway communicating with all of said plurality of guideways to receive all of said objects, means being provided for temporarily retarding the entrance of the objects of one row into said main guideway while the corresponding object of another row is moved into said main guideway, means being also provided in said main guideway for moving all of said objects into a continuous row to engage the operating members, and to obtain other results and advantages as may be brought out by the following description.

Referring to the accompanying drawings, in which like numerals of reference indicate the same parts throughout the several views, Figure 1 is a top plan view of a tile fettling machine embodying my invention;

Figure 2 is an enlarged transverse vertical sectional view taken on the line 2—2 of Fig. 1;

Figure 3 is an enlarged longitudinal sectional view of the entrance end of the machine taken on the line 3—3 of Fig. 1;

Figure 4 is an enlarged fragmentary transverse sectional view showing the mounting for the tile retarding plate;

Figure 5 is a similar view showing the adjustable mounting of the strips forming the tile guideways.

In the specific embodiment of the invention shown on the drawings, the reference characters 1 designate spaced and parallel sides of the frame of the machine which are adapted to be supported in any suitable manner in a substantially horizontal position. The machine illustrated in Figures 1 to 3 inclusive is shown especially for use with a tile press, and one end of the frame is adapted to be mounted on the lower die member B of the press while the other end may be supported by legs or standards, not shown. The sides 1 are connected at spaced intervals in their length by means of inverted T-shaped braces 2 which extend transversely of the frame as shown in Figures 1 and 2, the said members 2 being spaced from the top of the frame as shown in Figure 2. An endless conveyor is mounted longitudinally of the frame, and in the present instance I have shown the conveyor in the form of a belt 3 which passes around a roller 4 at one end of the frame and around the drive roller 5 at the other end of the frame with the upper reach in substantially the plane of the die B of the press, the drive roller being connected by any suitable means such as a belt pulley 6 to a suitable source of power. The construction of the frame and conveyor may be substantially the same as that disclosed in my copending application, Serial No. 477,661, and the details thereof are omitted from this application as they are not essential to an understanding of the present invention.

A plurality of guideways 7 are provided at one end of the frame to receive a corresponding number of rows of tiles, said guideways forming the entrance for the tiles to the machine. A plurality of said guideways 7 are arranged to feed the tile into a common main guideway 8. Any number of entrance guideways 7 may be provided in accordance with the number of rows of tiles it is desired to accommodate, and preferably one main guideway 8 is utilized for each two entrance guideways 7. In the present instance, the guideways 7 are arranged in alinement with the die cavities of the tile press so as to be capable of receiving the tiles as they are discharged from the press. It is a feature of the invention to provide means for alternately admitting tiles from different entrance guideways 7 into the main guideway 8 so that the tiles from the plurality of entrance guideways leading to the corresponding main guideways 8 may be arranged in alinement in a continuous row to be moved into engagement with fettling members, whereby one set of fettling members may be utilized for fettling tiles from a plurality of rows.

The guideways 7 and 8 may be conveniently formed by guide strips 9 one arranged at each side of the frame and a guide strip 10 arranged substantially centrally of the width of the frame, said strips 9 and 10 being secured to the braces 2. A guide strip 12 is arranged intermediate each of the side strips 9 and the central strip 10 so that four guideways 7 are provided transversely of the machine. Said guideways are shown as of a width slightly greater than the width of the tiles A to be operated upon, and the strips 9, 10 and 12 are spaced slightly above the conveyor 3 so as not to interfere with the operation of the conveyor belt. At opposite sides of each of the guideways 7 are arranged fettling members 13 which may be of any suitable construction, for instance such as disclosed in my copending application. Briefly described, said fettling members comprise body portions 14 which are secured to the respective guide strips in any suitable manner at substantially an angle of forty-five degrees, the body portions 14 at opposite sides of each of the guideways converging inwardly toward each other.ABRASIVE elements 15, preferably consisting of laminated strips of hard fibre and sandpaper, are secured at one end to the undersides of the body portions 14 so that the free ends thereof are adapted to lie in the path of the edges of the tiles moving through the guideways 7. With this construction, it will be obvious that the conveyor belt will move the tiles through the guide ways and that the abrading elements will yieldingly engage the edges of the tiles to remove the surplus material therefrom. This fettling operation is more specifically described in my said copending application.

One manner of retarding the tiles of certain of the rows while the tiles of other rows are permitted to move forwardly with the conveyor at their normal velocities, consists of a plate 16 of sheet metal secured to the undersides of the guide strips 12 and the center guide strip 10 at the forward ends of the guideways 7, said plate being adapted to substantially lie upon the conveyor belt 3. With this construction when the tiles are discharged from the press in the usual manner, those tiles in alinement with the two intermediate guideways 7 will be forced upon the sheet metal plate 16, it being understood that the tiles are usually forcibly pushed from the die member B by means of a dust box or the like. It will thus be seen that the said two tiles in the intermediate guideways 7 will be lifted from the conveyor belt by the plate 16 and held against movement by the belt, while the tiles in the two outer guideways continue their movements with the belt through the guideways and between the fettling members 13. Upon the discharge of the next batch of tiles from the press, the same action takes place, the two tiles which were initially positioned on the plate 16 being displaced by the subsequent corresponding tiles discharged from the press. Thus, the tiles in the intermediate guideways 7 are always at a distance ahead of the tiles in the outer guideways equal to at least the length of the tiles, the two tiles on the plate 16 forming a part of one batch moving ahead of the outside tiles of the next subsequent batch at a distance substantially equal to the length of the tiles. In this manner, the tiles in the outer and inner guideways 7 are caused to enter the corresponding main guideways 8 in alternate relation.

The plate 16 may be mounted on the guide strips 12 and 10 in any suitable manner, but in the present instance I have shown the plate as provided with a plurality of screws 17 swivelly connected to the plate as at 18 and threaded in the corresponding guide strips. Such a construction at the same time mounts the plate 16 on the guide strips and permits adjustment of the plate relatively to the conveyor to ensure the tiles riding on the plate in the proper manner. For holding the plate in adjusted position I may utilize jam nuts 19 on the screws 17. It will be understood that the plate 16 is of hard smooth metal and its edges to be crossed by the tiles will be rounded as at 20 so that no injury to the edges of the tiles will occur as they ride upon the plate.

As the tiles leave the entrance guideways 7 they enter the main guideways 8, and in accordance with the invention are here turned through an angle of substantially ninety degrees for the purpose of presenting the sides thereof at angles to the sides operated upon by the fettling members 13 to a second set of fettling members 21. The fettling members 21 may be identical in construction with the fettling members 14 and arranged in the same relation to the guideways 8, said fettling members 21 being disposed at the ends of the guideways 8 opposite the entrance guideways 7. The width of the guideways 8 between the fettling members 21 is slightly greater than the length of the tiles, while the intermediate width of the guideways 8 is slightly greater to permit turning of the tiles as hereinafter described.

For turning the tiles the inner edges of the outer guide strips 9 are provided with shoulders 22 adapted to be engaged by one corner of the tile moving through the outer guideway 7 to temporarily interrupt said corner while the other portions of the tile are moved by the conveyor 3 about the corner as a fulcrum, as clearly shown in Figure 1 of the drawings. Opposite sides of the central guide strip 10 are provided with similar shoulders 23 spaced longitudinally of the guideways 8 with relation to the shoulders 22 to be engaged by the inner tiles for turning them on the conveyor in the same manner as the outer tiles are turned by the shoulders 22. It will thus be seen that both the inner and outer tiles in both guideways 8 are turned through angles of substantially ninety degrees and arranged in alinement in a continuous row, so that they may be moved between the fettling members 21, which are adapted to remove the surplus material at the end edges of the tiles.

For the purpose of adjusting the width of the guideways 7 and 8, the guide strips 9, 10 and 12 may carry screws 32 passing through slots 33 in the cross pieces 2 and provided with wing nuts 34. Obviously, the screws and wing nuts securely support the guide strips on the cross pieces 2 and by loosening the wing nuts, the guide strips may be moved toward or away from each other by sliding the screws 32 in the slots 33.

The surplus material removed from the edges of the tile by the fettling members is forced to the top of the tiles, and for the purpose of removing this dust before the tiles are subjected to the glazing operation, I may journal a brush 35 in bearings 36 transversely of the frame to engage the tops of the tiles as they are moved by the conveyor 3. The brush may be constantly rotated by any suitable means such as the chain and sprocket connection 38 with the drive roller 5.

While I have shown and described one possible embodiment of my invention, it will be understood that this is mainly for the purpose of illustrating the principles of the invention and that many modifications and changes can be made in the detail construction and arrangement of the guideways 7 and 8 and the retarding devices, without departing from the spirit or scope of the invention. Furthermore, the invention is susceptible of use in devices for conveying other articles or objects than tile and for other purposes than fettling, abrading, polishing, etc. Therefore, I do not wish to be understood as limiting myself except as required by the following claims when construed in the light of the prior art.

Having thus described the invention, what I claim is:

1. A machine of the character described comprising a support to receive simultaneously a plurality of rows of objects, means for causing successively the objects of different ones of said rows to move on said support at different velocities and all of said objects to move at the same velocities, whereby the objects of certain rows are caused to move ahead of the corresponding objects in the other rows, means for manipulating said objects on said support to position all of said objects in a single continuous row, and means for operating upon said objects as they are moved on said support.

2. A machine of the character described comprising a support to receive simultaneously a plurality of rows of objects, means for causing successively the objects of different ones of said rows to move on said support at different velocities and all of said objects to move at the same velocities, whereby the objects of certain rows are caused to move ahead of the corresponding objects in the other rows, a guideway to receive said objects successively one at a time, automatic means for causing said objects to enter said guideway one at a time in a single row, and means at each side of said guideway for operating upon said objects as they are moved on said support.

3. A machine of the character described comprising a support to receive simultaneously a plurality of rows of objects, means for moving said objects on said support, means for temporarily retarding movement of the objects of certain of said rows to permit the corresponding objects of the other rows to move ahead of said first-mentioned rows, means for positioning the objects from said rows alternately in a single continuous row, and means for operating upon said objects as they are moved on said support.

4. A machine of the character described comprising a support to receive simultaneously a plurality of rows of objects, means for moving said objects on said support, means for temporarily retarding movement of the objects of certain of said rows to permit the corresponding objects of the other rows to move ahead of said first-mentioned rows, means for moving the objects from all of said rows on said support alternately into a single continuous row, and means for operating upon said objects as they are moved on said support.

5. A machine of the character described comprising a conveyor to receive and move simultaneously a plurality of rows of objects, means for holding the objects of certain of said rows against movement with said conveyor to permit the corresponding objects of the other rows to be moved ahead of said first-mentioned objects, means for causing movement of said objects relatively to said conveyor to position all of said objects in a single continuous row, and means for operating upon said objects as they are moved by said conveyor.

6. A machine of the character described comprising a conveyor to receive and move simultaneously a plurality of rows of objects, means fixed relatively to said conveyor to be engaged by the objects in certain of said rows to hold said objects against movement with said conveyor and permit movement of the corresponding objects of the other rows ahead of the first-mentioned objects, means for positioning all of said objects in a single continuous row, and means for operating upon said objects as they are moved by said conveyor.

7. A machine of the character described comprising a support to receive simultaneously a plurality of rows of objects, means for moving said objects of different rows on said support at different velocities and transversely relative to each other to position all of said objects in a single continuous row, and means for operating upon said objects in each of said rows as they are moved on said support.

8. A machine of the character described comprising a conveyor to receive and move simultaneously a plurality of rows of objects, means for causing successive relative longitudinal and relative transverse movement of the objects of certain ones of said rows and said conveyor to position the objects of all of said rows in a single continuous row, and means for operating upon said objects in each of said rows as they are moved by said conveyor.

9. A machine of the character described comprising a support to receive simultaneously a plurality of rows of objects, means for causing successively the objects of different ones of said rows to move on said support at different velocities and all of said objects to move at the same velocities, whereby the objects of certain rows are caused to move ahead of the corresponding objects in the other rows, means for turning all of said objects in their own planes on said support and positioning them in a single continuous row simultaneously with said turning, and means for operating upon said objects in each of said rows as they are moved on said support.

10. A machine of the character described comprising a conveyor to receive and move simultaneously a plurality of rows of objects, means for holding the objects of certain of said rows against movement with said conveyor to permit the corresponding objects of the other rows to be moved ahead of said first-mentioned objects means fixed relatively to said conveyor for successively turning all of said objects in their own planes on said conveyor and positioning them in a single continuous row simultaneously with said turning, and means for operating upon said objects in each of said rows as they are moved by said conveyor.

11. A machine of the character described comprising a frame, a plurality of guideways spaced transversely of said frame to receive simultaneously a corresponding number of rows of objects, a second guideway to receive said objects of all of said rows successively one at a time, means for moving said objects through said first-mentioned guideways, a series of operating members to engage said objects as they are moved through said guideway, means in certain of said guideways for retarding movement of said objects therethrough whereby the corresponding objects of the other guideways are moved ahead of said first-mentioned objects, means between said first-mentioned guideways and the second-mentioned guideway for moving all of said objects into a single continuous row for entry into said second-mentioned guideway, and a second series of operating members to engage said objects as they are moved through said second-mentioned guideway, 12. A machine of the character described comprising a frame, a plurality of guideways spaced transversely of said frame to receive simultaneously a corresponding number of rows of objects, a second guideway to receive said objects of all of said rows successively one at a time, means for moving said objects through said first-mentioned guideways, means in certain of said guideways for retarding movement of said objects therethrough whereby the corresponding objects of the other guideways are moved ahead of said first-mentioned objects, means between said first-mentioned guideways and the second-mentioned guideway for turning all of said objects in their own planes and positioning them in a single continuous row for entry into said second-mentioned guideway, and means for operating upon said objects as they are moved through each of said guideways.

13. A machine of the character described comprising a frame, a conveyor thereon to simultaneously receive and move a plurality of rows of objects, means on said frame above said conveyor and arranged in the paths of the objects in certain of said rows to raise said objects from said conveyor and hold said objects against movement to permit the corresponding ones of said objects to move ahead of the first-mentioned objects, and means for operating upon said objects as they are moved by said conveyor.

14. A machine of the character described comprising a frame, a conveyor thereon to simultaneously receive and move a plurality of rows of objects, plates on said frame above said conveyor and arranged in the paths of the objects in certain of said rows, said objects being moved upon said plates from said conveyor whereby said objects are held against movement to permit the corresponding objects of other rows to move ahead of said first-mentioned objects, and means for operating upon said objects as they are moved by said conveyor.

15. A machine of the character described comprising a frame, a conveyor thereon to simultaneously receive and move a plurality of rows of objects, plates on said frame above said conveyor and arranged in the paths of the objects in certain of said rows, said objects being moved upon said plates from said conveyor whereby said objects are held against movement to permit the corresponding objects of other rows to move ahead of said first-mentioned objects, and said first-mentioned objects being removed from said plates onto said conveyor by the next succeeding objects in the corresponding rows as the latter move upon said plates, and means for operating upon said objects as they are moved by said conveyor.

16. A tile fettling machine including a frame, a conveyor thereon to receive and move simultaneously a plurality of rows of tiles, a series of fettling members on said frame for each row of tiles to engage opposite parallel corner edges of said tiles as they are moved by said conveyor, means on said frame for retarding movement of the tiles in certain of said rows while the corresponding tiles of other rows move ahead of the first-mentioned tiles after operation thereon by said fettling members, a second series of fettling members to engage corner edges of said tiles angularly disposed in the same plane to said first-mentioned edges, and means for turning all of said tiles in their own planes and positioning them in a single continuous row for operation thereon by said second series of fettling members.

17. A tile fettling machine including a frame, a conveyor thereon to receive and move simultaneously a plurality of rows of tiles, a series of fettling members on said frame for all of said rows to engage opposite parallel corner edges of said tiles as they are moved by the conveyor, and means for positioning all of said tiles in a single continuous row for operation thereon by said series of fettling members.

18. A tile fettling machine including a frame, a conveyor thereon to receive and move simultaneously a plurality of rows of tiles, a series of fettling members on said frame for all of said rows to engage opposite parallel corner edges of said tiles as they are moved by the conveyor, means for retarding movement of the tiles in certain of said rows to permit corresponding tiles of other rows to move ahead of the first-mentioned tiles, and means for producing relative transverse movement of said first-mentioned and said second-mentioned tiles to position all of said tiles in a single continuous row for operation thereon by said fettling members.

ANTHONY W. CRISTIANI.